United States Patent [19]

Erkfritz

[11] 4,329,091

[45] May 11, 1982

[54] FLOATING WEDGE FOR USE IN CONJUNCTION WITH AN INDEXABLE CUTTING TOOL

[75] Inventor: Donald S. Erkfritz, Clarkston, Mich.

[73] Assignee: General Electric Company, Columbus, Ohio

[21] Appl. No.: 147,540

[22] Filed: May 7, 1980

[51] Int. Cl.³ .............................................. B26D 1/12
[52] U.S. Cl. ........................................ 407/41; 407/50; 407/95; 407/108; 407/109; 407/111
[58] Field of Search ...................... 407/41, 49, 50, 76, 407/81–84, 88, 89, 94, 95, 108, 109, 111, 3–5

[56] References Cited

U.S. PATENT DOCUMENTS

| | | | |
|---|---|---|---|
| 899,608 | 9/1908 | Newbold | 407/50 |
| 2,966,968 | 1/1961 | Skeel | 407/49 |
| 2,982,009 | 5/1961 | Swenson | 407/41 |
| 3,214,825 | 11/1965 | Williams | 407/94 |
| 3,311,116 | 7/1967 | Fussenhauser et al. | 407/3 |

FOREIGN PATENT DOCUMENTS 150642  7/1955  Sweden ............................ 29/105 R

*Primary Examiner*—Leonidas Vlachos
*Attorney, Agent, or Firm*—Hedman, Casella, Gibson & Costigan

[57] ABSTRACT

A floating wedge is described for facilitating the mounting of an indexable insert in a pocket of an indexable cutting tool. The floating wedge includes a main body member having opposed leading and trailing surfaces and a swivel plate member having opposed leading and trailing surfaces. The leading surface of the main body member and the trailing surface of the swivel plate member are disposed in abutting relationship and are provided with complementary configurations, thereby enabling the relative slidable movement between the members such that orientation of the leading surface of the swivel plate member relative to the trailing surface of the main body member may be adjusted. The adjustability between the members enables full and equal contact pressure to be established between the floating wedge, the indexable insert and the walls of the insert pocket, thereby eliminating localized stresses and preventing insert failure. In a preferred embodiment of the subject invention, the trailing surface of the main body member and the associated wall of the pocket of the cutting tool are provided with complementary configurations. The latter arrangement allows for the relative movement between the leading surface of the swivel plate member and the walls of the insert pocket, thereby increasing the range of motion of the floating wedge.

10 Claims, 6 Drawing Figures

FLOATING WEDGE FOR USE IN CONJUNCTION WITH AN INDEXABLE CUTTING TOOL

This invention relates to a new and improved floating wedge for use in conjunction with an indexable cutting tool. More particularly, a floating wedge is provided which is receivable in an insert pocket of a cutting tool for securing an indexable insert therein. The floating wedge of the subject invention consists of two members which are relatively movable such that the orientation of the leading surface of the wedge may be altered to achieve full contact pressure between the insert, wedge and insert pocket, thereby eliminating localized stress which can lead to failure of the insert.

BACKGROUND OF THE INVENTION

In the prior art, various wedge retention systems have been devised for securing an indexable insert within an insert pocket of a cutting tool. The cutting tool, which for example, may be of the type which is intended to be rotated about a central axis, is provided with at least one insert pocket which is adapted to receive an indexable cutting insert having opposed planar rake surfaces and a plurality of sharpened edge faces. The insert pocket has opposed generally planar leading and trailing walls. In use, an insert is mounted in the pocket and is secured therein by a wedge. Preferably, the wedge is readily removable to allow the indexing of the insert when the exposed cutting edge becomes worn.

In a cutting operation, relatively strong forces are exerted on the cutting edges of the insert. In order to prevent the insert from shifting within the insert pocket, the cutting tool is designed such that the wedge securely presses the insert against a wall of the pocket, at a point of the insert adjacent the upper edge of a rake face. While this arrangement functions to maintain the insert within the pocket, localized stresses arise at the points of contact which tend to cause the inserts to crack or fracture. Further, after a period of use, an insert may shift into an out of parallel orientation which will also cause localized stresses to develop.

The problems associated with the occurrence of localized stresses became more acute when ceramic inserts are utilized instead of the more common hardened tungsten carbide inserts. Ceramic inserts, while advantageous in certain operations, such as the milling of cast iron parts in the auto industry, tend to be relatively brittle and will fracture easily if subjected to localized stresses.

To reduce the likelihood of fracture of the ceramic inserts, the insert pockets of the cutting tool must be accurately machined to precise gauge tolerances such that full and equal contact pressure is established between the pocket wall and the insert, thereby reducing localized stresses. As can be appreciated, the machining of insert pockets to fine tolerances is time consuming and expensive. Further, even when the pockets are properly machined, the inserts may still shift to an out of parallel orientation wherein localized stresses will develop.

Accordingly, it is an object of the subject invention to provide a new and improved floating wedge which enables full and equal contact pressure to be established between the walls of the insert pocket and the insert, thereby eliminating localized stresses which will result in insert fracture.

It is another object of the subject invention to provide a floating wedge which will inhibit the development of localized stresses and eliminate the necessity of machining an insert pocket to highly accurate gauge tolerances.

It is a further object of the subject invention to provide a floating wedge consisting of a main body member and a swivel plate member which are capable of relative movement such that the orientation of the leading surface of the wedge relative to the trailing surface of the wedge may be adjusted, to facilitate the alignment of the insert within the insert pocket.

It is still another object of the subject invention to provide a wedge assembly wherein both the axial and radial float may be adjusted when mounting an insert in a cutting tool.

SUMMARY OF THE INVENTION

In accordance with the subject invention, a new and improved floating wedge is provided and is intended for use with an indexable cutting tool including an insert pocket having opposed leading and trailing walls. The terms leading and trailing relate to the direction of rotation of the cutting tool with the leading surface preceding the trailing surface, however the terms are used only for orientation purposes and are not intended to limit the scope of the subject invention.

The floating wedge is receivable in the insert pocket for securing therein an indexable insert having opposed planar rake faces. The floating wedge of the subject invention includes a main body member having opposed leading and trailing surfaces, with the trailing surface thereof being adapted to abut the trailing wall of the insert pocket. The floating wedge further includes a swivel plate member having opposed leading and trailing surfaces, with the leading surface thereof being substantially planar and adapted to abut one of the planar rake surfaces of the indexable insert. In accordance with the subject invention, the trailing surface of the swivel plate member and the leading surface of the main body member are disposed in abutting relationship and are provided with complementary configurations which enable the relative slidable movement therebetween. By this arrangement, the orientation of the planar leading surface of the swivel plate member relative to the trailing surface of the main body member may be adjusted to securely seat the insert within the insert pocket in a position wherein full and equal contact pressure is achieved along the rake faces of the insert.

In a preferred embodiment of the subject invention, the leading surface of the main body member and the trailing surface of the swivel plate member are arcuate in configuration which functions to limit the relative movement between said members. An engagement means may be provided between the abutting surfaces of the main body member and the swivel plate member which in combination with the arcuate configuration of the members, functions to restrict the relative movement of the members about a predetermined axis of rotation. In a preferred embodiment of the subject invention, the engagement means comprises a tongue and groove arrangement formed in the abutting surfaces of the members. The tongue and groove arrangement may be dovetail in configuration to maintain the members in abutting relationship and enhance the stability of the wedge. In the alternative embodiment, a spring is provided which connects the members and maintains them in abutting relationship.

To provide for maximum adjustability of the floating wedge, it is preferable that the trailing surface of the main body member and the abutting trailing wall of the insert pocket be provided with complementary configurations. This arrangement permits the relative movement between the main body member and the wall of the insert pocket which varies the orientation of the leading surface of the swivel plate member. The opposed complementary surfaces may be arcuate in configuration which functions to constrain the relative movement therebetween about a predetermined axis of rotation. In the latter arrangement, it is preferable that the curvature of the trailing surface of the main body portion be disposed such that the predetermined axis of rotation is perpendicular to the axis of rotation between the main body member and the swivel plate member thereby enabling the adjustment of both the radial and axial float. The above described floating wedge enables the orientation of the front planar surface of the swivel plate to be readily adjusted, relative to the walls of the insert pocket, such that full and equal contact pressure may be achieved between the insert, wedge and insert pocket to minimize the development of localized stresses and reduce the likelihood of insert fracture.

Further objects and advantages of the subject invention will become apparent from the following detailed description, taken in conjunction with the drawings in which:

DESCRIPTION OF THE PREFERRED EMBODIMENT

Figure 1:
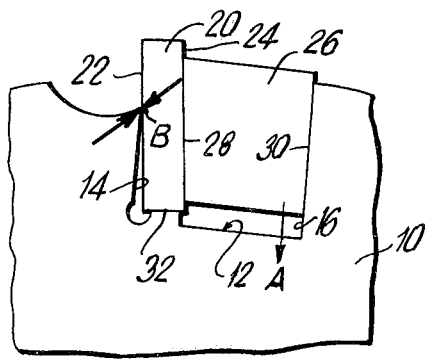
FIG. 1 illustrates an insert and wedge assembly in an insert pocket of a cutting tool as used in the prior art.

Turning now more specifically to FIG. 1, there is illustrated a wedge assembly and an insert pocket as used in the prior art. More particularly, a portion of the body of cutting tool 10 is illustrated which includes an insert pocket 12 having opposed leading and trailing walls 14 and 16. The insert pocket 12 is adapted to receive an indexable insert 20 having opposed, planar front and rear rake surfaces 22 and 24. The indexable insert 20 is securely mounted into the insert pocket 12 by means of an adjustable wedge member 26, having opposed leading and trailing surface 28 and 30. When mounting the insert 20 within the insert pocket 12, the wedge 26 is driven radially inwardly in the direction indicated by arrow A, until the insert 20 is securely seated. The insert 20 is initially placed in the pocket 12 with an edge face of the insert abutting the locating rail 32 of the insert pocket. Thereafter, the wedge 26 is driven radially inwardly with the trailing surface 30 thereof abutting the trailing wall 16 of the insert pocket, while the leading surface 28 of the wedge 26 abuts the rear planar surface 24 of the insert. The wedge is tightened until the insert 20 is securely locked in preparation for a cutting operation.

During a cutting operation, the upper portion of the front rake surface 22 of the insert 20 is subjected to relatively strong forces as the cutting tool 10 is rotated past the workpiece. Therefore, to prevent the shifting of the insert during the cutting operation, the insert pocket 12 is designed such that the insert is clamped between the leading wall 14 of the pocket, and the wedge. As illustrated in FIG. 1, contact pressure as indicated by arrows in FIG. 1 is established at a point B adjacent the cutting edge of the insert to prevent the insert 20 from shifting during the cutting operation. As can be appreciated however, this arrangement, while functioning to keep the insert in place, gives rise to localized stresses at the contact point B. The development of localized stresses tends to cause the insert to fracture and break down. This problem becomes especially acute when utilizing inserts formed from a ceramic material rather than a hardened tungsten carbide. Thus, to prevent the development of localized stresses, the insert pocket must be accurately machined to precise gauge tolerances to insure that the insert will be in parallel relationship to both the leading wall of the pocket and the wedge.

Figure 2:
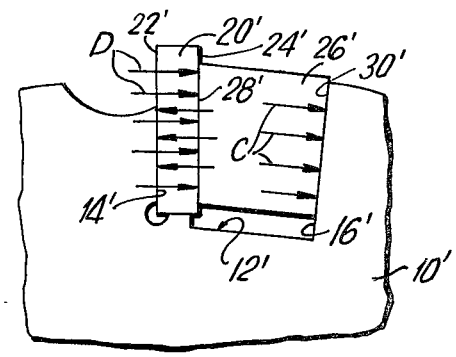
FIG. 2 is a schematic view of a theoretically ideal wedge assembly wherein full and equal contact pressure is established between the insert, wedge and insert pocket.

Referring to FIG. 2, wherein like numbers indicate like parts, a theoretically ideal wedge assembly and insert pocket are shown wherein full and equal contact pressure is established between the abutting faces of the insert 22', the wedge 26' and the walls 14' and 16' of the insert pocket 12'. More specifically, the insert pocket 12' is machined such that the trailing surface 30' of the wedge 26' is in parallel and abutting relationship with the trailing wall 16' of the insert pocket such that equal contact pressure is achieved therealong as indicated by arrows C. Further, the planar rake surfaces 22' and 24' of insert 20' are in parallel and abutting relationship with the front wall 14' of the insert pocket, as well as the leading surface 28' of the wedge, respectively. By this arrangement, full and equal contact pressure is established along both faces of the insert, as indicated by arrows D.

While the accurate machining of the insert pocket 12', as illustrated in FIG. 2, provides full and equal contact pressure when the insert is initially mounted, during a cutting operation, the pressures exerted on the insert will sometimes cause the insert to shift into an out of parallel orientation such that localized stresses will still develop.

Therefore, in accordance with the subject invention, applicant has provided a new and improved floating wedge assembly which is operative to achieve full and equal contact pressure between the insert, wedge and insert pocket without the need for machining the walls of the insert pocket to highly accurate gauge tolerances. Further, should the orientation of the insert tend to shift during a cutting operation, the orientation of the floating wedge will tend to shift along with the insert thereby maintaining the parallel orientation.

Figure 3:
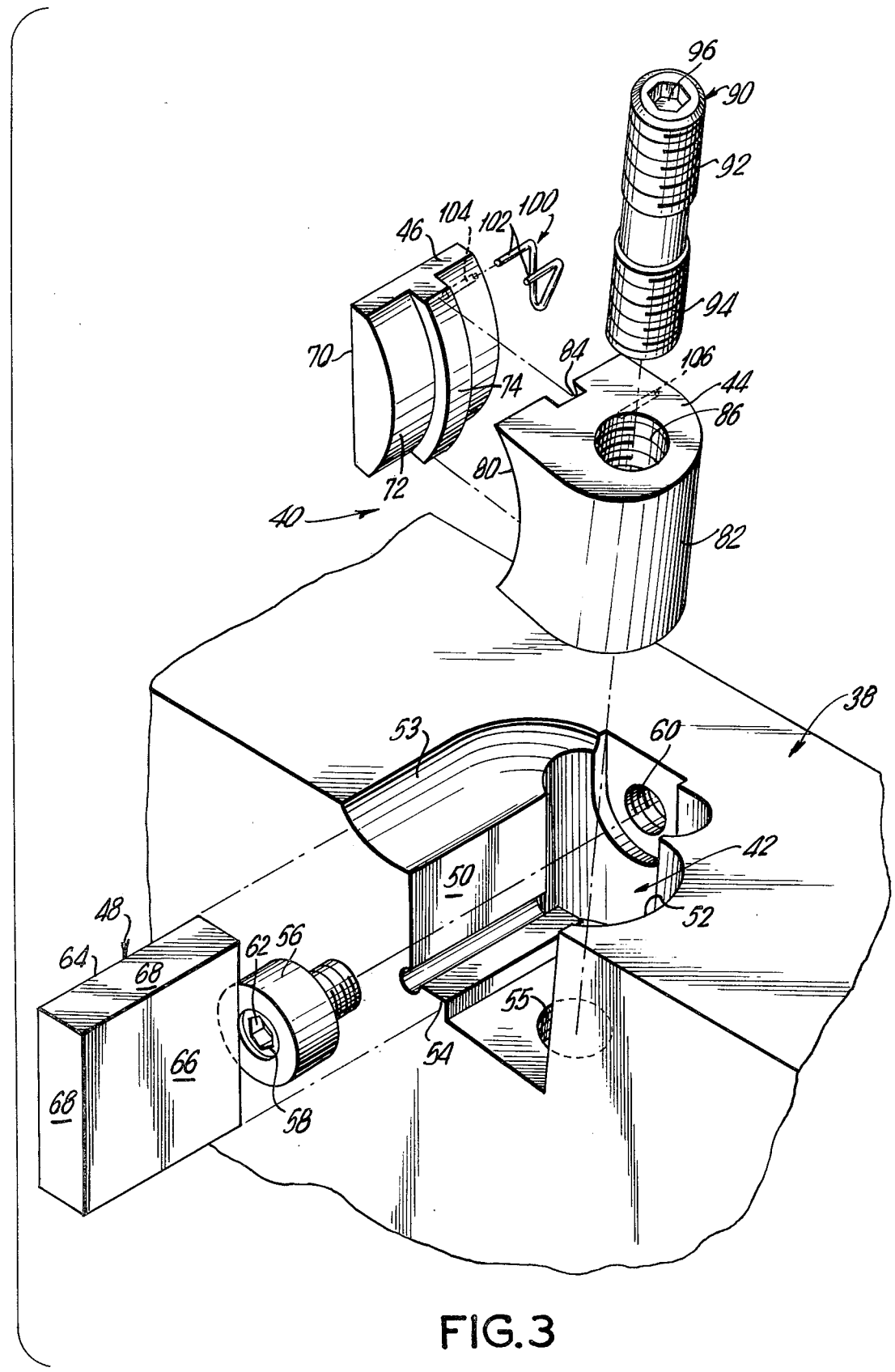
FIG. 3 is an exploded perspective view of the new and improved floating wedge of the subject invention as used in conjunction with an indexable insert and a cutting tool.

As illustrated in FIG. 3, the new and improved floating wedge of the subject invention is adapted for use with an indexable cutting tool 38 having at least one insert pocket 42 therein. The floating wedge, indicated generally by the numeral 40, which consists of a main body member 44 and a swivel plate member 46, is receivable within the insert pocket 42 for securing an insert 48 therein.

Figure 4:
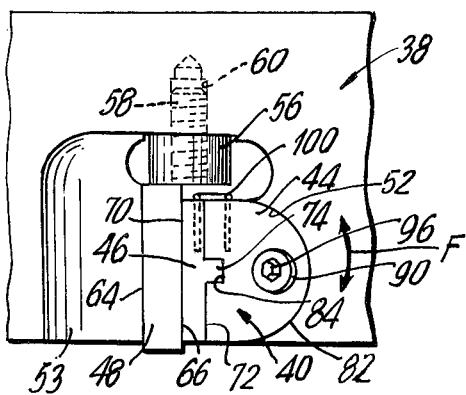
FIG. 4 is a top elevational view of the floating wedge assembly of the subject invention.

The insert pocket 42 is provided with opposed leading and trailing walls 50 and 52. A chip removal recess 53 is provided adjacent the leading wall 50 of the pocket to aid in channeling metal particles away from the insert 48 during a cutting operation. Trailing wall 52 has an arcuate concave configuration and has a curvature substantially similar to the curvature of the trailing surface of the main body member 44. A locating rail 54 is provided on the bottom surface of the insert pocket 42 for controlling the radial rake of the insert. A threaded aperture 55 is also provided on the bottom wall of the insert pocket. The axial location of the insert 48 is fixed by the rest pad 56 (as illustrated in FIG. 4) which is secured within the insert pocket 42 by means of a differential set screw 58. Set screw 58 is receivable in threaded aperture 60 provided in the back wall of the insert pocket. Set screw 58 is provided with a noncircular recess 62 to facilitate the tightening of the screw by a suitable driver to secure the rest pad 56 within the insert pocket and fix the axial position of the insert 48.

The indexable insert 48, which is generally square in configuration, has opposed planar rake surfaces 64 and 66 with a plurality of edge faces 68 disposed therebetween. While the subject invention is illustrated in combination with a square planar insert, it will be apparent to one skilled in the art that the subject invention may be modified for use with other types of insert shapes and configurations, as well with both negative and positively cleared inserts.

In accordance with the subject invention, floating wedge 40 coacts with the walls of the pocket 42 to securely seat insert 48 therein. The floating wedge includes a swivel plate member 46 having opposed leading and trailing surfaces 70 and 72. Preferably, the leading surface 70 of the swivel plate member 46 is provided with a configuration conforming to the configuration of the rear rake surface 66 of the insert 48 and in this case, is provided with a planar configuration. The trailing surface 72 of swivel plate member 46 is provided with an arcuate convex configuration. A longitudinally extending arcuate tongue 74 is provided on the trailing surface 72 of the swivel plate 46 and is adapted for engagement with a groove in the main body member 44 of the wedge 40, as more fully described hereinafter.

The main body member 44 is provided with opposed leading and trailing surfaces 80 and 82. The leading surface 80 of the main body member 44 is provided with a configuration which is complementary to the configuration of the trailing surface 72 of the swivel plate member 46. As illustrated in FIG. 3, the leading surface 80 has an arcuate, concave configuration, with a curvature substantially similar to the curvature of the convex trailing surface 72 of the swivel plate member 46. While complementary arcuate configurations are illustrated in the drawings, it is intended that the scope of the subject invention include any complementary configuration, for example, a hemispherical configuration, which will permit the relative slidable movement between the swivel plate member 46 and the main body member 44.

The leading surface 80 of the main body member 44 further includes a groove 84 which is configured to receive the tongue 74 of the rear surface 72 of swivel plate member 46. The tongue and groove arrangement in combination with the complementary arcuate configuration of the opposed surfaces of the floating wedge 40, functions to constrain the relative movement between the members about a predetermined axis of rotation, corresponding to the central axis of the curved surfaces.

The trailing surface 82 of the main body member 44 is provided with an arcuate, convex configuration having a radius of curvature substantially similar to the curvature of the concave trailing wall 52 of the insert pocket 42. In the preferred embodiment, the central axis of the arcuate trailing surface 82 of the main body member 44 is perpendicular to the central axis of the arcuate leading surface 80, such that the adjustments to the orientation of the swivel plate member 46 relative to the insert pocket 42 may be made in two dimensions. Stated differently, and as more fully described hereinafter, by providing for adjustability about two distinct axes which are orthogonally disposed, both the axial and radial float of the front surface 70 of the swivel plate member 46 may be adjusted to eliminate localized stresses.

The main body member 44 is further provided with a threaded central aperture 86 extending therethrough which is adapted to receive a differential screw 90. Differential screw 90 is provided with radially outer and inner threaded portions 92 and 94 which are threaded in opposite directions. The radially outer threaded portion 92 is adapted to be engaged in the central aperture 86 of the main body member 44, while the radially inward threaded portion 94 of screw 90 is adapted to be received in the aperture 55 in the bottom wall of the insert pocket. Differential screw 90 is provided with a non-circular recess 96 to facilitate the turning of the screw by a driver or other suitable tool. In use, the rotation of screw 90 will cause the radial position of the floating wedge 40 to be varied.

Figure 5:
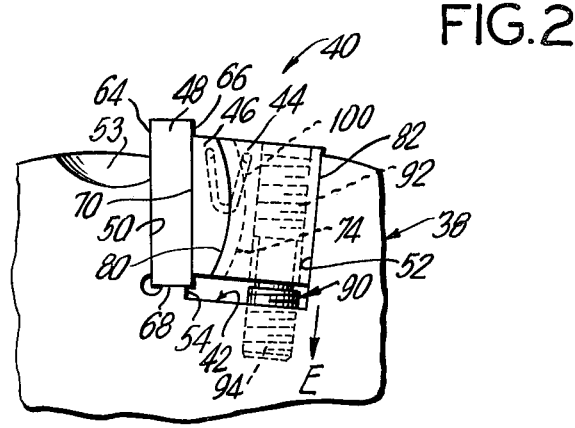
FIG. 5 is a side elevational view of the floating wedge assembly of the subject invention as illustrated in FIG. 4.

In the first embodiment of the subject invention, as illustrated in FIGS. 3–5, a retaining spring 100 is provided to aid in maintaining the swivel plate member 46 and the main body member 44 in abutting relationship. Retaining spring 100 which is formed from approximately 0.02 inch (#8) piano wire, is generally V-shaped in configuration and has two projecting pin portions 102 which extend perpendicularly from the plane of the V-configuration. The swivel plate member 46 and the main body member 44 are provided with two cylindrical receiving channels 104 and 106 which are adapted to receive the pin portions 102 of retaining spring 100. Once the pin 100 is inserted into both the channels 104 and 106, the members 46 and 44 will be held in abutting relationship, however, the flexibility of the retaining spring 100 permits the relative movement between the swivel plate member 46 and the main body member 44.

The use of the above described floating wedge 40 in conjunction with an indexable cutting tool ensures that full and equal contact pressure is established between the walls of the insert pocket 42, the insert 48, and the floating wedge 40. In operation, as illustrated in FIGS. 4 and 5, the insert 48 is initially placed within the insert pocket 42 such that the bottom edge face 68 rests on the locating rail 54 of the insert pocket. The height of the locating rail 54 will determine the radial positioning of the insert 48. The axial positioning of the insert is fixed by the location of the rest pad 56, as shown in FIG. 4. More specifically, an edge face 68 of the insert is placed in abutting relationship with the rest pad 56 such that the axial position of the rest pad fixes the axial overhang of the insert.

The insert 48 is then securely mounted within the insert pocket 42 by tightening the floating wedge 40 within the pocket. More particularly, the floating wedge 40 is shifted radially inwardly (in the direction of arrow E in FIG. 5) until the insert is securely locked in place. The floating wedge 40 is adjusted radially inwardly by rotating differential screw 90 using an appropriate driver engaged in the non-circular recess 96 provided in the top of the differential screw 90.

Further referring to FIG. 5, as the floating wedge 40 is tightened by adjusting its position radially inwardly, the swivel plate member 46 will slide, relative to the main body member 44, such that a radially parallel relationship will be established between the leading surface 70 of the swivel plate 46 and the leading wall 50 of the insert pocket with the insert disposed therebetween. In accordance with the subject invention, the opposed complementary configuration of the abutting surfaces of the swivel plate member 46 and the main body member 44 permit the slidable movement therebetween. As the floating wedge is adjusted radially inwardly, any out of parallel orientation of the insert will cause unequal pressures to be exerted on the swivel plate member 46, whereby its position relative to the main body member 44 will shift until the forces are equalized. As noted above, restraining spring 100 is flexible and does not inhibit the relative movement of the members.

The complementary curvatures of members 44 and 46 in combination with the tongue 74 and groove 84 arrangement therebetween functions to constrain the relative movement of the members about a single predetermined axis of rotation, thereby enabling the adjustment of the radial float. In order to provide for the adjustment of the axial float, the trailing surface 82 of the main body member 44 is provided with an arcuate configuration having a central axis which is perpendicular to the central axis of the arcuate leading surface 80. As more particularly illustrated in FIG. 4, the trailing wall 52 of the insert pocket is provided with a complementary arcuate configuration. By this arrangement, relative movement is permitted between the main body member 44 and the wall 52 of the insert pocket in the direction indicated by arrows F, and thus the axial float of the wedge 40 may also be adjusted. Similar to the selfadjusting radial float between the swivel plate member 46 and the main body member 44, as the floating wedge 40 is tightened radially inwardly, any axially out of parallel condition of the insert will exert unequal forces on the floating wedge 40 causing the axial position of the wedge to shift until the leading surface 70 of the swivel plate 46 is in an axially parallel orientation. Thus, as the floating wedge 40 is tightened, both the axial and radial float are automatically varied until a parallel configuration is achieved between the leading surface 70 of the swivel plate member 46, the insert 48 and the leading wall 50 of the insert pocket. By this arrangement, and as illustrated in FIG. 2, the forces throughout the insert pocket and wedge assembly are balanced, thereby eliminating localized stresses which could fracture and destroy the inserts during use.

Figure 6:
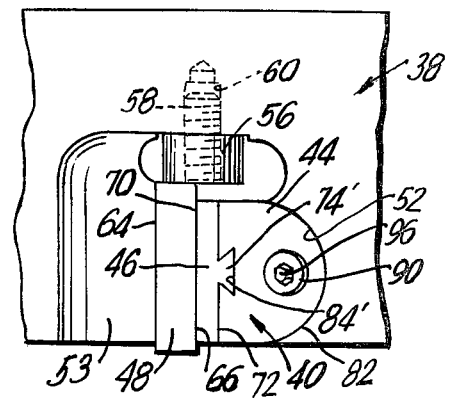
FIG. 6 is a top elevational view of a second embodiment of the floating wedge assembly of the subject invention.

FIG. 6 illustrates a second embodiment of the subject invention wherein like members are used to designate like parts. In this embodiment, the tongue 74' of the swivel plate member 46 is provided with a dovetail configuration and the groove 84' in the leading surface 80 of the main body member 44 is configured to receive the dovetail tongue 74'. The dovetail tongue and groove arrangement is provided to enhance the stability of the floating wedge 40 and functions to maintain the members 44, 46 in abutting relationship. In this embodiment of the subject invention, the use of a retaining spring is unnecessary, since the dovetail tongue and groove arrangement maintains the members in abutting relationship, while permitting relative movement therebetween. The operation of the second embodiment of the floating wedge 40 is similar to the operation of the first embodiment. More specifically, as differential screw 90 is rotated causing the floating wedge 40 to be adjusted radially inwardly, the complementary configurations of the abutting surfaces of members 44, 46 permits relative movement therebetween such that the radial float is automatically adjusted, thereby achieving a radially parallel configuration. Further, the complementary configurations of the trailing surface 82 of the main body member 44 and the trailing wall 52 of the insert pocket 42, permits the axial float to be automatically adjusted providing an axially parallel configuration. Accordingly, the insert 48 and the wedge 40 will be securely mounted within the insert pocket, whereby full and equal contact pressure is established between the members 44, 46 and the walls of the pocket, thereby eliminating localized stresses and decreasing the likelihood of insert fracture during a cutting operation.

In summary, applicant's invention provides for a new and improved floating wedge 40 consisting of a main body member 44 having opposed leading and trailing surfaces 80, 82 and a swivel plate member 46 also having opposed leading and trailing surfaces 70, 72, with the leading surface 80 of the main body member 44 and the trailing surface 72 of the swivel plate member being disposed in abutting relationship. The abutting surfaces are provided with complementary configurations which permits relative sliding movement between the respective members for adjusting the orientation of the leading surface 70 of the swivel plate member. In the preferred embodiment of the subject invention, the complementary configurations are arcuate and include a tongue and groove arrangement for constraining the relative movement between the members about a predetermined axis of rotation to permit adjustment of the radial float of the wedge 40. The trailing surface 82 of the main body member 44 and the abutting trailing wall 52 of the insert pocket are also provided with complementary arcuate configurations which enable the relative movement between the wedge 40 and the wall 52 about a predetermined axis of rotation which is perpendicular to the axis of rotation between the swivel plate member 46 and the main body member 44. The relative movement between the swivel plate member 46, the main body member 44 and the trailing wall 52 of the insert pocket, permits the automatic adjustment of both the axial and radial positions of the leading surface of the swivel plate member 46. More particularly, in use, as the floating wedge 40 is adjusted radially inwardly to secure the insert within the insert pocket, any out of parallel orientation of the insert will exert unequal forces on the floating wedge, such that the orientation of the wedge will shift until a parallel orientation is achieved between the wedge, the insert and the walls of the insert pocket. This parallel configuration functions to establish full and equal contact pressures, along the entire rake faces of the insert, thereby minimizing localized stresses and reducing the likelihood of insert fracture during a cutting operation.

It is to be understood that changes may be made in the particular embodiments of the subject invention in light of the above teachings, but that these will be within the full scope of the invention as defined by the appended claims. For example, while the floating wedge of the subject invention is illustrated as being located behind the insert, it is intended that the scope of the subject invention include an arrangement wherein the floating wedge is disposed in front of the insert within the insert pocket.

I claim:

1. In combination with an indexable cutting tool having at least one insert pocket formed therein, with said insert pocket having opposed leading and trailing walls and with said trailing wall having an arcuate configuration, a floating wedge for securely mounting an indexable cutting insert in said insert pocket comprising:

a main body member having opposed leading and trailing surfaces wherein said trailing surface of said main body member has an arcuate configuration complementary to said trailing wall of said insert pocket thereby enabling relative slidable movement between said main body member and said trailing wall of said insert pocket, with said movement being about a first predetermined axis of rotation relative to said trailing wall of said insert pocket such that the orientation of said floating wedge relative to the trailing wall of said insert pocket may be adjusted, and with said leading surface of said main body member being arcuate about a second axis of rotation which is perpendicular to the first axis of rotation of the arcuate trailing surface of said main body member; and a swivel plate member having opposed leading and trailing surfaces with the trailing surface of said swivel plate member having an arcuate configuration that is complementary to the arcuate configuration of the leading surface of the main body member thereby enabling slidable movement between the trailing surface of said swivel plate member and the leading surface of said main body member about said second axis of rotation means for moving said wedge into clamping engagement with said insert and said trailing pocket wall.

2. A floating wedge as recited in claim 1 further including a means for engagement between said main body member and said swivel plate member, said engagement means for limiting the relative movement between said members about the second predetermined axis of rotation.

3. A floating wedge as recited in claim 2 wherein said engagement means comprises:

a groove formed in the leading surface of said main body member; and a complementary tongue formed in the trailing surface of said swivel plate member.

4. A floating wedge as recited in claim 3 wherein said tongue provided on the trailing surface of said swivel plate member is dovetail in configuration and wherein said groove provided on the leading surface of said main body member is configured to receive said dovetail tongue, said dovetail tongue and groove arrangement being operative to enhance the stability of said floating wedge.

5. A floating wedge as recited in claim 1 further comprising a spring means engaged with both said body member and said swivel plate member for holding said members in abutting relationship while enabling the relative movement therebetween.

6. A floating wedge adapted to be received in an insert pocket of an indexable cutting tool, said insert pocket having opposed leading and trailing walls, with said trailing wall having an arcuate configuration, said floating wedge for securely mounting an indexable cutting insert in said insert pocket, said cutting insert having opposed planar rake surfaces, said floating wedge comprising:

a main body member having opposed leading and trailing surfaces wherein said trailing surface of said main body member has an arcuate configuration complementary to said trailing wall of said insert pocket thereby enabling relative slidable movement between said main body member and said trailing wall of said insert pocket, with said movement being about a first predetermined axis of rotation relative to said trailing wall of said insert pocket such that the orientation of said floating wedge relative to the trailing wall of said insert pocket may be adjusted, and with said leading surface of said main body member being arcuate about a second axis of rotation which is perpendicular to the first axis of rotation of the arcuate trailing surface of said main body member; and swivel plate member having an arcuate configuration that is complementary to the arcuate configuration of the leading surface of the main body member thereby enabling slidable movement between the trailing surface of said swivel plate member and the leading surface of said main body member about said second axis of rotation means for moving said wedge into clamping engagement with said insert and said trailing pocket wall.

7. A floating wedge as recited in claim 6 further including a means for engagement between said main body member and said swivel plate member, said engagement means for limiting the relative movement between said members about the second predetermined axis of rotation.

8. A floating wedge as recited in claim 7 wherein said engaging means comprises:

a groove formed in the leading surface of said main body member; and a complementary tongue formed in the trailing surface of said swivel plate member.

9. A floating wedge as recited in claim 8 wherein said tongue in said swivel plate member is dovetail in configuration and wherein said groove in said leading surface of said main body member is configured to receive said dovetail tongue, said dovetail tongue and groove arrangement for enhancing the stability of said floating wedge.

10. A floating wedge as recited in claim 6 further comprising a spring means engaged with both said main body member and said swivel plate member for holding said members in abutting relationship while enabling the relative movement therebetween.

* * * * *

UNITED STATES PATENT AND TRADEMARK OFFICE
CERTIFICATE OF CORRECTION

PATENT NO. : 4,329,091
DATED : May 11, 1982
INVENTOR(S) : Donald S. Erkfritz

It is certified that error appears in the above—identified patent and that said Letters Patent is hereby corrected as shown below:

In Claim 6, column 10, line 32, before "swivel", insert

--a swivel plate member having opposed leading and trailing surfaces with the leading surface being substantially planar and adapted to abut one of the planar rake surfaces of said indexable cutting insert, and with the trailing surface of said--

Signed and Sealed this

Twenth-eighth Day of September 1982

[SEAL]

Attest:

Attesting Officer

GERALD J. MOSSINGHOFF

Commissioner of Patents and Trademarks